(12) United States Patent
Wo

(10) Patent No.: US 11,735,099 B1
(45) Date of Patent: Aug. 22, 2023

(54) LED ARRAY DISPLAY FOR USE IN CREATING HIGH FIDELITY SIMULATIONS OF CLUTTER ENVIRONMENT

(71) Applicant: DHPC Technologies, Inc., Woodbridge, NJ (US)

(72) Inventor: Yei Wo, East Brunswick, NJ (US)

(73) Assignee: DHPC Technologies, Inc., Woodbridge, NJ (US)

( * ) Notice: Subject to any disclaimer, the term of this patent is extended or adjusted under 35 U.S.C. 154(b) by 142 days.

(21) Appl. No.: 17/212,599

(22) Filed: Mar. 25, 2021

(51) Int. Cl.
  *G09G 3/32* (2016.01)
  *G09G 3/00* (2006.01)
  *G01J 1/08* (2006.01)

(52) U.S. Cl.
  CPC ............... *G09G 3/32* (2013.01); *G09G 3/03* (2020.08); *G01J 1/08* (2013.01); *G01J 2001/083* (2013.01)

(58) Field of Classification Search
  CPC ..... G09G 3/32; G09G 3/03; G01J 1/08; G01J 2001/083
  See application file for complete search history.

(56) References Cited

U.S. PATENT DOCUMENTS

| | | | |
|---|---|---|---|
| 5,282,014 A | 1/1994 | Ruhl, Jr. et al. | |
| 5,336,894 A | 8/1994 | Ellers | |
| 5,581,813 A | 12/1996 | Henschel | |
| 6,513,438 B1 | 2/2003 | Fegg et al. | |
| 6,813,593 B1 | 11/2004 | Berger | |
| 7,343,861 B1 | 3/2008 | Baker | |
| 8,330,088 B2 * | 12/2012 | Jennings | G01S 17/74 250/203.1 |
| 8,403,253 B1 | 3/2013 | Cohen et al. | |
| 9,570,002 B2 * | 2/2017 | Sakariya | G06F 3/042 |
| 2012/0025079 A1 | 2/2012 | Raulerson et al. | |

FOREIGN PATENT DOCUMENTS

| | | |
|---|---|---|
| CN | 103630153 A | 8/2016 |
| RU | 2549072 C1 | 4/2015 |

* cited by examiner

*Primary Examiner* — Mary Ellen Bowman
(74) *Attorney, Agent, or Firm* — LaMorte & Associates P.C.

(57) ABSTRACT

A display that can play dynamic video imagery using purely infrared light. Such dynamic video imagery is useful in testing infrared detection equipment. The display contains thousands of solid state infrared LEDs. Different infrared LED types are used. Each type of LED in use emits infrared light in some selected band of the infrared spectrum. The overall display can be designed to simulate infrared signal sources for a particular type of infrared detection system. If a particular infrared detection system detects infrared energy only in a specific range, the infrared LED display can be made to have a high resolution of LEDs within that specific range and a lower resolution of LEDs outside that specific range that would be useful for calibration purposes.

13 Claims, 5 Drawing Sheets

LED ARRAY DISPLAY FOR USE IN CREATING HIGH FIDELITY SIMULATIONS OF CLUTTER ENVIRONMENT

BACKGROUND OF THE INVENTION

1. Field of the Invention

In general, the present invention relates to the structure and design of LED displays. More particularly, the present invention relates to LED displays that are specifically designed to produce images in wavelengths outside the visible spectrum for use in simulating complex signal sources in a testing simulator.

2. Prior Art Description

There are many systems that are designed to identity and track the infrared signature of various objects. Such systems are widely used in the military to track a variety of weapon platforms and active weapon systems. For example, certain missiles track targets by following a selected infrared signature. Infrared detection systems are also used by aircraft to identify hidden vehicles, people, and weapon systems. In order to develop, test, and improve various infrared detection systems for use in the field, the infrared detection systems must be exposed to repeated testing. Different objects produce different infrared signatures. The infrared signatures differ in size, shape, intensity, duration, and wavelength. If the infrared detection system is intended to track or identify various vehicles, weapon platforms, and/or weapon systems, then real-world testing would require the operation of those vehicles, weapon platforms, and/or weapon systems. This course of testing is both overly expensive and inconvenient. Accordingly, testing infrared detection systems using actual objects often proves to be too expensive and problematic to be practical.

Many of the problems associated with using a real-world object can be removed by simulating the infrared signal source that corresponds to that object. Such a simulation involves irradiating the infrared detection system being tested with a test infrared signal that has the appropriate intensity, and the appropriate temporal, spatial, and spectral characteristics needed to mimic the infrared signal source.

In the real world, there is typically a great amount of movement between a detection device and the object being detected. Furthermore, the object being detected often moves through a complex field of background noise. One of the few practical ways to simulate such a dynamic field of view is to play a simulation on a high-fidelity display and aim the detection device at the display. The detection device remains stationary while the image on the display can move through the field of view. The obvious problem with such a testing system is that most electronic displays are designed to emit visible light. As such, only visible light detection systems can be tested. However, if a system being tested is designed to detect signals outside of the visible light spectrum, traditional electronic displays cannot be effectively utilized.

Most high fidelity displays currently in use are LED displays. These displays contain a matrix of LEDs that emit light in a variety of visible colors. The colors are typically red/green/blue or red/green/blue/yellow. By lighting the LEDs in different combinations, most colors in the visible light spectrum can be created. There are some LED matrices that contain LEDs that emit light outside the visible light spectrum. However, such LEDs matrices are used for illumination rather than for image display. For example, many surveillance camera systems have the ability to detect infrared light. Some such systems use matrices of infrared LEDs to illuminate an area with infrared light. Such infrared illuminators typically contain less than a dozen infrared LEDs of the same type and have resolutions of only one or two LEDs per square centimeter. This small resolution and monochromatic output make such infrared illumination matrices unable to simulate complex infrared signal sources.

In the prior art, there are electronic displays where infrared LEDs are mixed with visible light LEDs. However, the infrared LEDs are not used to emit light. Rather, the infrared LEDs are used to detect infrared radiation. Such infrared LEDs are utilized in touch screens to detect when a person's finger touches a screen. Such prior art displays are exemplified by U.S. Pat. No. 9,570,002 to Sakariya. Since the infrared LEDs in such prior art displays do not emit infrared light, these displays cannot be used to simulate complex infrared signal sources.

Accordingly, a need exists for creating an electronic display that can simulate the infrared signature of different objects and different background clutter profiles, with enough fidelity to be useful for simulation testing. This need is met by the present invention as described and claimed below.

SUMMARY OF THE INVENTION

The present invention is a display that can play dynamic video imagery using purely infrared light. Such dynamic video imagery is useful in testing infrared detection equipment. The display is an LED display. The LED display contains thousands of solid state infrared LEDs. The resolution of the display is high enough to be considered at least a high definition display.

The infrared LEDs used in the display are not uniform. Rather, a plurality of different infrared LEDs are used. Each type of LED in use emits infrared light is some selected band of the infrared spectrum. The overall display can be designed to simulate infrared signal sources for a particular type of infrared detection system. If a particular infrared detection system detects infrared energy only in a specific range, the infrared LED display can be made to have a high resolution of LEDs within that specific range and a lower resolution of LEDs outside that specific range that would be useful for calibration purposes.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention is an electronic LED display that is capable of reproducing the infrared emission signature of a selected object. The infrared emission signature can be used to test, calibrate, or develop an infrared detection system that is herein referred to as the Device Under Test (DUT). The present invention simulates the infrared signature of various objects, such as weapon platforms and weapon systems. These infrared signatures are directed toward the DUT to test, calibrate, or otherwise develop the DUT. In the description below, three exemplary embodiments of the present invention system are illustrated and described. These embodiments are selected in order to set forth some of the best modes contemplated for the invention. The illustrated embodiments, however, are merely exemplary and should not be considered limitations when interpreting the scope of the appended claims.

Figure 1:
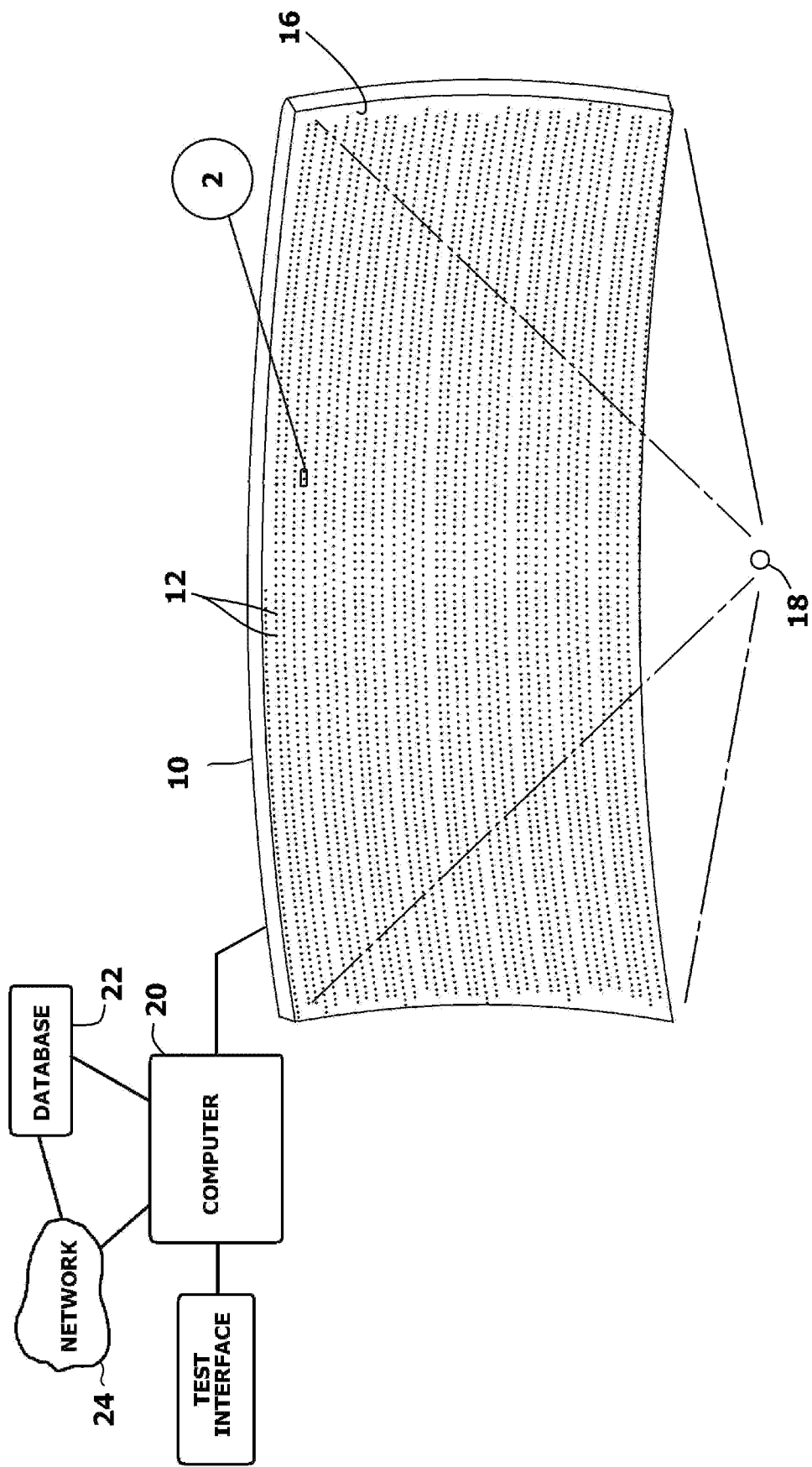
FIG. 1 shows an exemplary infrared LED display with a spherical curvature.
Figure 2:
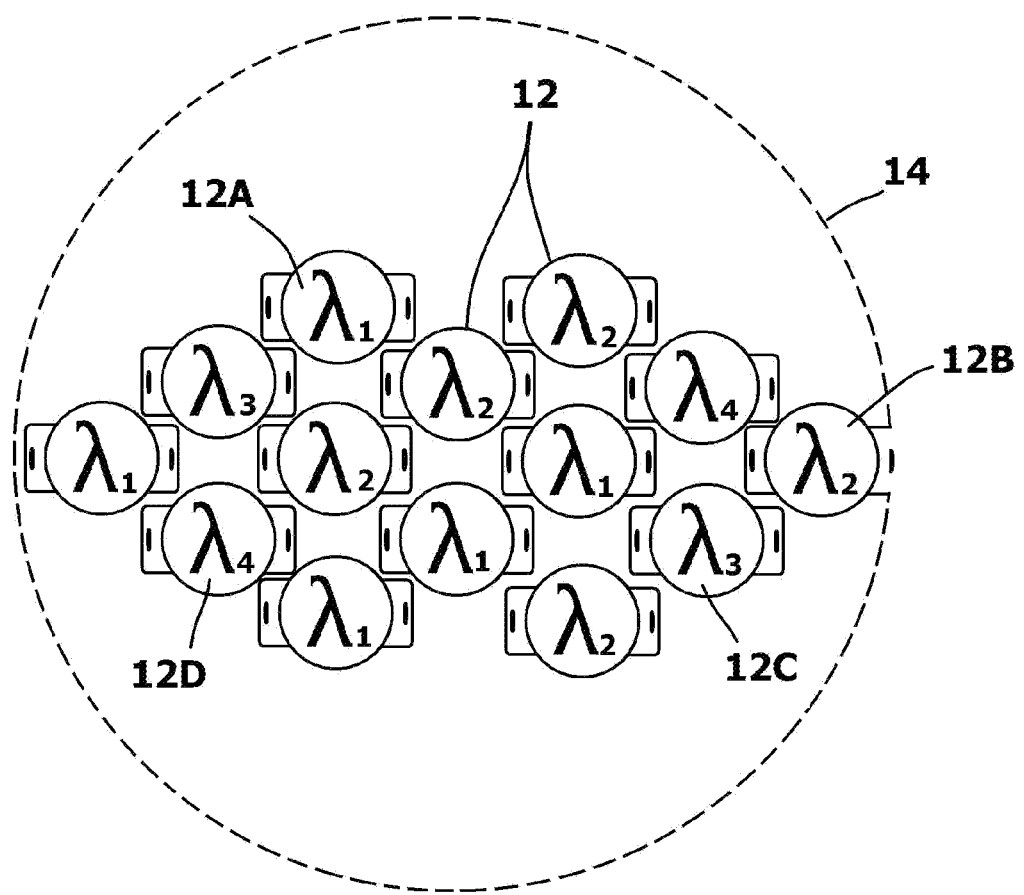
FIG. 2 shows an enlarged section of the screen surface of the exemplary infrared LED display of FIG. 1.
Figure 3:
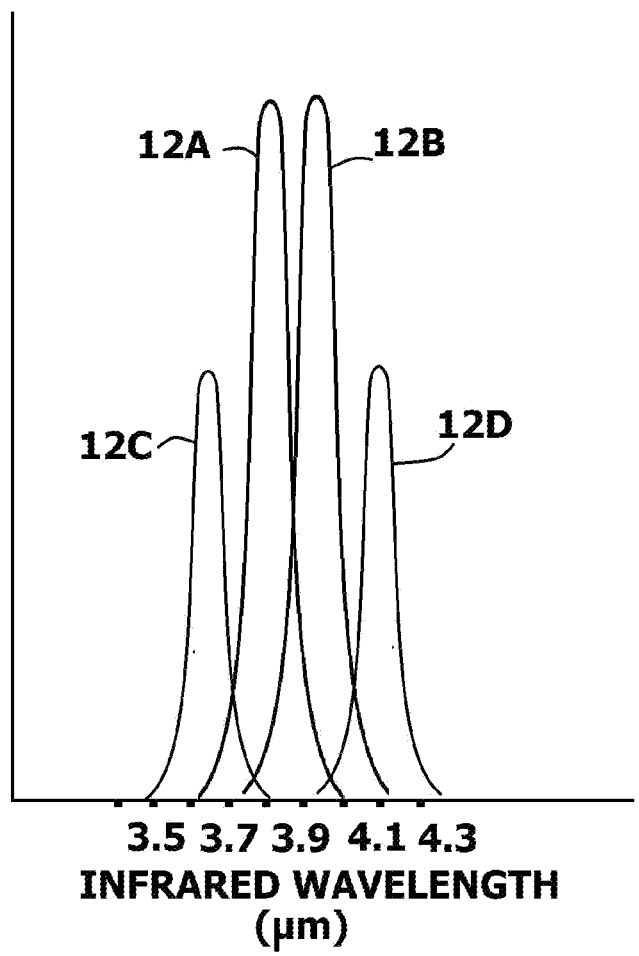
FIG. 3 shows a wavelength chart illustrating the emission bandwidths of the infrared LEDs used in the infrared LED display of FIG. 1.

Referring to FIG. 1, in conjunction with FIG. 2 and FIG. 3, it can be seen that an infrared LED display 10 is provided. The infrared LED display 10 is an LED display that only contains infrared LEDs 12. That is, the LEDs 12 in the LED display 10 emit light in the infrared band of the electromagnetic spectrum. The infrared LEDs 12 are solid state and are preferably arranged in pixel clusters 14. The resolution density of the infrared LEDS 12 is at least 720p, which is high enough for the infrared LED display 10 to be considered high definition (HD) by display industry standards. However higher resolutions, such as FHD, UHD, 4K and 5K can also be used, as can future resolutions when manufacturing processes permit.

Regardless of the resolution selected, all the infrared LEDs 12 in the infrared LED display 10 emit infrared light. However, many of the infrared LEDs 12 differ in that they emit infrared light in different infrared frequency bands. Within each of the pixel clusters 14 are different infrared LEDs 12A, 12B, 12C, 12D that emit infrared light in slightly different frequency bands within the infrared spectrum. Although four different infrared LEDs 12A, 12B, 12C, 12D are illustrated, it will be understood that any plurality of infrared LED types can be used. The range of the infrared LEDs 12 is determined by the infrared signal source that needs to be simulated. As an application example, consider that the DUT is a military grade infrared detection system that primarily detects a section of the mid-wavelength infrared band between the frequencies of 3.7 µm and 4.3 µm. In order to test such a detection system, the infrared LED display 10 selected for use for simulation needs to have a high resolution in this range. As such, the pixel cluster 14 would have a high density of infrared LEDs 12A, 12B that can emit radiation in bands between the frequencies of 3.7 µm and 4.3 µm. Each pixel cluster 30 would also contain other infrared LEDs 12C, 12D, at lower resolutions, that emit infrared radiation in bands outside the selected range in order to simulate background clutter and to calibrate the DUT. Using the four illustrated infrared LED types 12A, 12B, 12C, 12D as an example, the first type of infrared LED 12A has an emission band between 3.6 µm and 4.0 µm, with a peak intensity of about 3.8 µm. The second type of infrared LED 12B has an emission band between 3.9 µm and 4.3 µm, with a peak intensity of about 4.2 µm. Since the densities of the first infrared LEDs 12A and the second infrared LEDs 12B are highest in each pixel cluster 14, the overall infrared LED display 10 has the highest fidelity between 3.7 µm and 4.3 µm.

Referring to FIG. 1 only, it can be seen that the illustrated infrared LED display 10 has a screen surface 16 that is curved. The curvature follows a spherical shape. That is, the screen surface 16 has a single radius of curvature that makes all the points on the screen surface 16 equidistant from a common image focal point 18. Due to the curvature of the screen surface 16, all the infrared LEDs 12 contained within the infrared LED display 10 are pointed towards the image focal point 18. When utilized in a larger simulation system, secondary optical elements can be used to collimate the emitted infrared radiation and direct the infrared radiation to a DUT.

The infrared LED display 10 is capable of simulating various infrared signatures. It will be understood that practically all of the infrared radiation emitted by the infrared LED display 10 passes through the image focal point 18 and can be directed to a DUT with a minimal amount of transmission losses. The infrared LED display 10 is operated by a computer 20. The computer 20 has access to a database 22 of infrared signatures that correspond to various objects. The database 22 may be within the computer 20 or accessible by the computer 20 from another source, via a data network 24. Each infrared signature may have a recorded profile (intensity, temporal, spectral) from an actual object, such as an enemy weapon platform. The database 22 can contain thousands of recordings of various objects at different distances and angles to the observer. Accordingly, when a particular infrared signature is selected for display, it is played on the infrared LED display 10, wherein all of the infrared radiation signature features of the selected objects are simulated. Accordingly, the DUT can be tested, calibrated, or otherwise developed without having to incur the expense and complex logistics of observing real-world objects.

Figure 4:
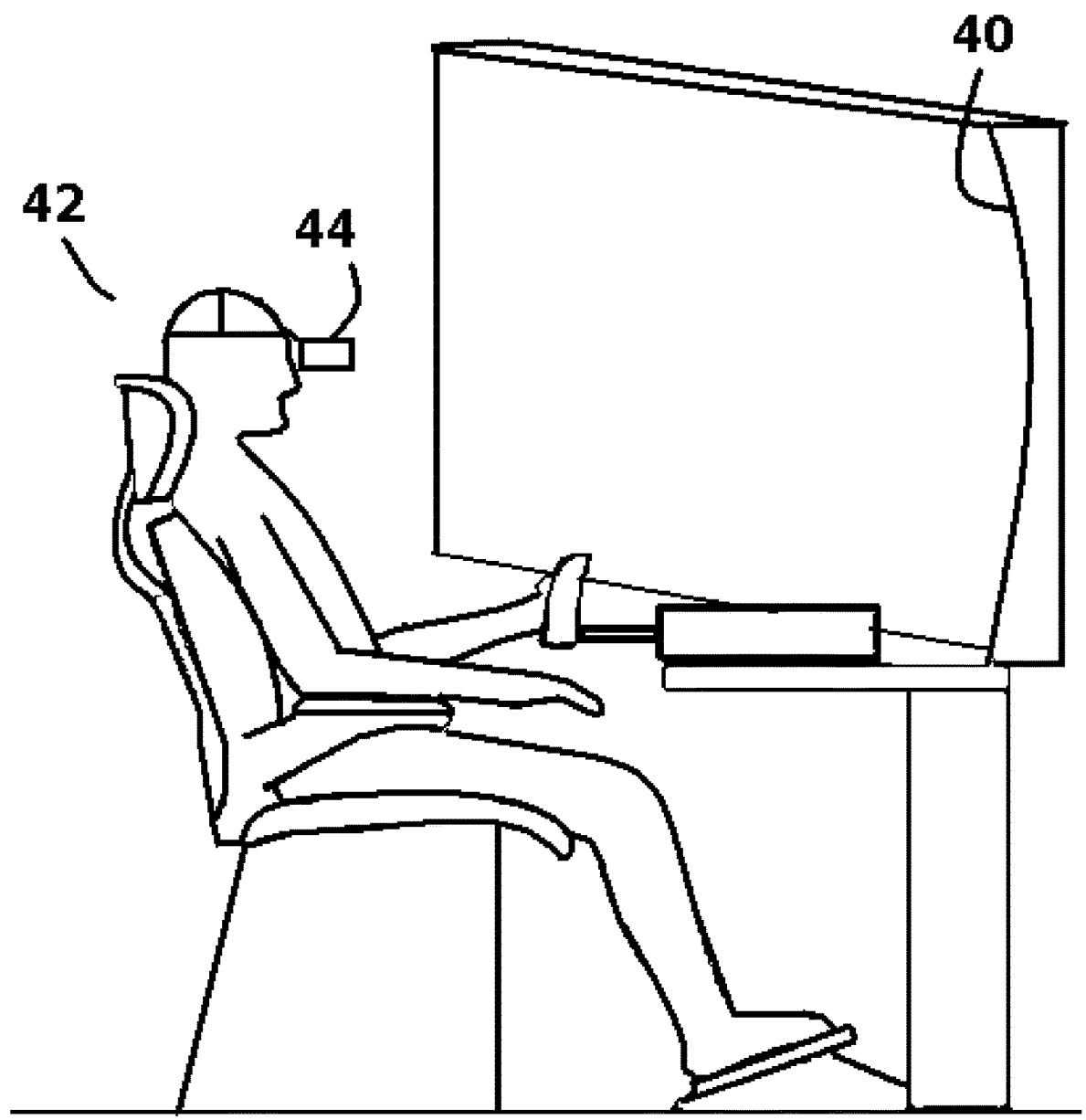
FIG. 4 shows alternate embodiments of an infrared LED display used in a flight simulator.

In the embodiment of FIG. 1, the infrared LED display 10 is spherically curved. This configuration is useful for creating simulations for many types of electronic DUTs. However, the infrared LED display 10 can also be configured to simulate training for people, such as pilots and special warfare operators who wear night vision goggles. Referring to FIG. 4, an alternate embodiment of infrared LED displays 40 are shown. In this embodiment, infrared LED displays 40 are used to simulate the nighttime environment surrounding a training cockpit 42 for a military aircraft flying at night. In the shown embodiment, the infrared LED displays 40 are either flat or curved in a single plan. Furthermore, since the infrared LED displays 40 are being used to simulate the infrared radiation detectable by night vision goggles 44, the infrared LED displays 40 are made with infrared LEDs 42 that emit wavelengths primarily detectable by the night vision goggles 44.

Figure 5:
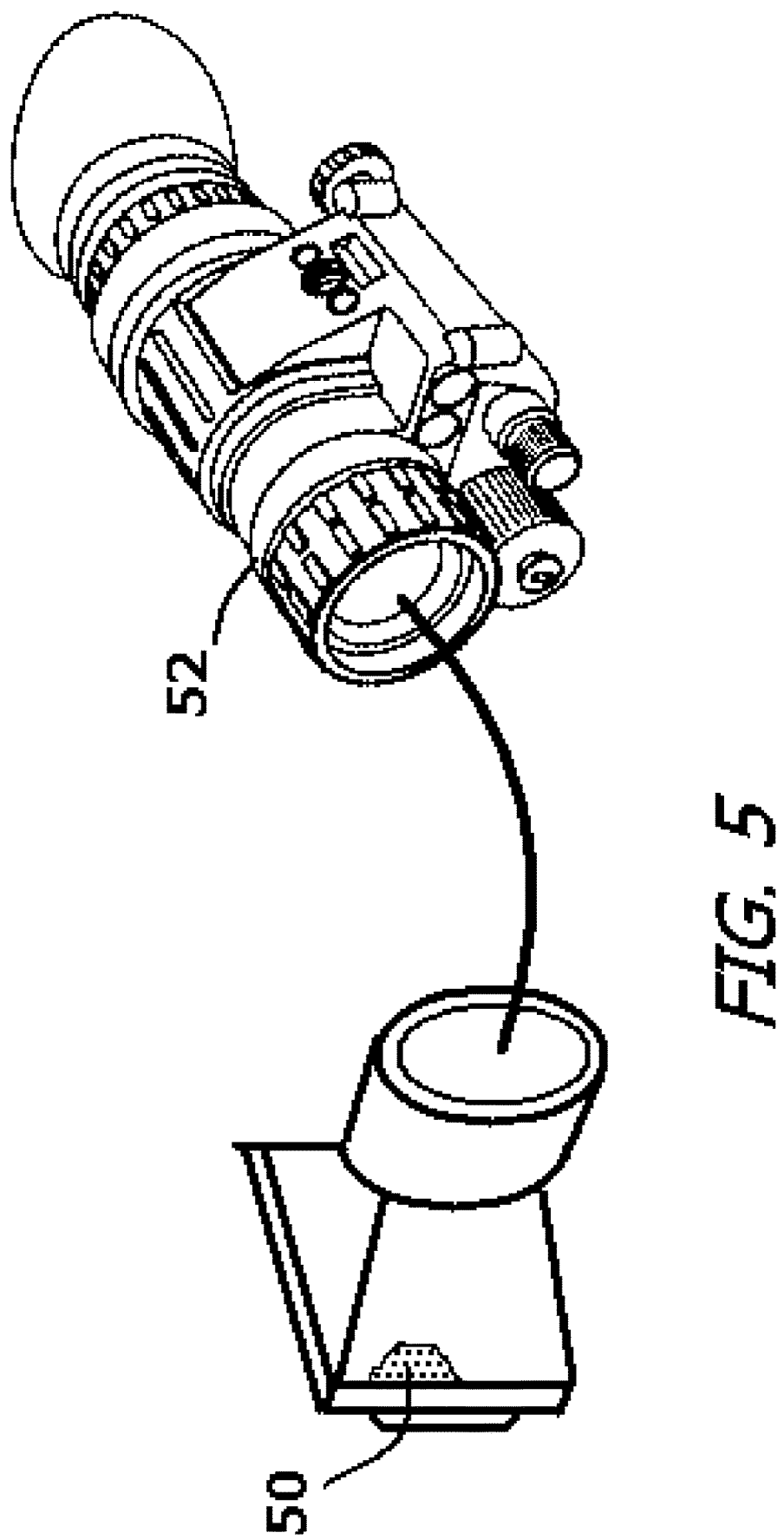
FIG. 5 shows an alternate embodiment of an infrared LED display being used to simulate infrared signal sources for a set of night vision goggles.

Referring to FIG. 5, a simpler variation of the present invention is shown. In this embodiment, only a single, flat infrared LED display 50 is used to generate an infrared signal source. The infrared LED display 50 is configured to mount directly to a night vision device 52 such as a night vision weapons scope. In this manner, the infrared LED display 50 can provide a continuous simulation while moving with the night vision goggles 52 or weapons scope.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A display for playing video imagery useful in testing infrared detection equipment, said display comprising:
   an LED display that contains only infrared LEDs, wherein said infrared LEDs include groupings of LEDs, wherein each of said groupings of LEDs includes a higher density of said infrared LEDs in a selected infrared wavelength band and a lower density of said infrared LEDs in at least one infrared wavelength band outside of said selected infrared wavelength band.

2. The display according to claim 1, wherein said LED display has a display resolution of at least 720p.

3. The display according to claim 1, wherein said infrared LEDs are arranged on a curved screen surface.

4. The display according to claim 3, wherein said curved screen surface has a spherical curvature and each of said infrared LEDs is directed toward a common image focal point.

5. The display according to claim 1, wherein said selected infrared wavelength band is between 3.7 μm and 4.3 μm.

6. A display for playing imagery useful in testing infrared detection equipment, said display comprising:
   an LED display having a display resolution of at least 720p, wherein said LED display contains only LEDs that emit light in infrared bands, wherein said LEDs include pixel groupings of LEDs that each contain a higher density of said infrared LEDs in a selected infrared wavelength band and a lower density of said infrared LEDs in at least one infrared wavelength band outside of said selected wavelength band.

7. The display according to claim 6, wherein said LEDs are arranged on a curved screen surface.

8. The display according to claim 7, wherein said curved screen surface has a spherical curvature and each of said LEDs is directed toward a common image focal point.

9. The display according to claim 8, wherein said selected infrared wavelength band is between 3.7 μm and 4.3 μm.

10. An LED display containing only solid state infrared LEDs of different types, wherein each of said types of said solid state infrared LEDs emits infrared light in a different bandwidth range.

11. The display according to claim 10, having a display resolution of at least 720p.

12. The display according to claim 10, wherein said infrared LEDs are arranged on a curved screen surface.

13. The display according to claim 12, wherein said curved screen surface has a spherical curvature and each of said infrared LEDs is directed toward a common image focal point.

* * * * *